(12) United States Patent
Altenberger et al.

(10) Patent No.: US 7,738,117 B2
(45) Date of Patent: Jun. 15, 2010

(54) METHOD OF MANUFACTURING AN OPTICAL ELEMENT (75) Inventors: Michael Altenberger, Aalen (DE); Bernd Doerband, Aalen (DE); Thomas Willkens, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 262 days.

(21) Appl. No.: 11/905,235

(22) Filed: Sep. 28, 2007

(65) Prior Publication Data

US 2008/0117436 A1 May 22, 2008

Related U.S. Application Data

(63) Continuation-in-part of application No. PCT/EP2006/002434, filed on Mar. 16, 2006.

(60) Provisional application No. 60/666,175, filed on Mar. 30, 2005.

(51) Int. Cl.
*G01B 11/02* (2006.01)

(52) U.S. Cl. ................................ 356/511

(58) Field of Classification Search ................. 356/511, 356/513–514
See application file for complete search history.

(56) References Cited

U.S. PATENT DOCUMENTS

| | | | |
|---|---|---|---|
| 4,872,755 A | 10/1989 | Küchel | |
| 5,301,010 A * | 4/1994 | Jones et al. | 356/479 |
| 5,548,403 A | 8/1996 | Sommargren | |
| 5,933,236 A | 8/1999 | Sommargren | |
| 6,359,692 B1 | 3/2002 | Groot | |
| 6,801,323 B2 * | 10/2004 | Evans | 356/513 |
| 7,050,175 B1 | 5/2006 | Freimann et al. | |
| 7,057,738 B2 * | 6/2006 | Millerd et al. | 356/495 |
| 7,274,467 B2 | 9/2007 | Doerband et al. | |
| 2002/0085208 A1 | 7/2002 | Hauger et al. | |
| 2002/0179866 A1 | 12/2002 | Hoeller et al. | |
| 2003/0160968 A1 | 8/2003 | Deck | |
| 2004/0141184 A1 | 7/2004 | Ucki | |
| 2004/0190002 A1 | 9/2004 | Schulte et al. | |
| 2006/0098210 A1 * | 5/2006 | Freimann et al. | 356/521 |

FOREIGN PATENT DOCUMENTS

DE 100 41 041 3/2002

(Continued)

OTHER PUBLICATIONS

J. Schwider, "White-light Fizeau interferometer", Mar. 1, 1997, vol. 36, No. 7, Applied Optics, pp. 1433-1437.

(Continued)

*Primary Examiner*—Michael A Lyons
(74) *Attorney, Agent, or Firm*—Sughrue Mion, PLLC (57) ABSTRACT

A method of manufacturing an optical element involves an interferometric test of the optical element using an interferometer system of a Fizeau type combined with principles of white-light interferometry. The optical element is disposed in a cavity between a Fizeau surface and a mirror, and an optical path difference between a back surface of the optical element and the mirror is determined for determining parameters of the optical element, such as a thickness thereof. Measuring light from an optical delay apparatus can be supplied to the Fizeau interferometer through an optical fiber.

17 Claims, 6 Drawing Sheets

FOREIGN PATENT DOCUMENTS

| | | |
|---|---|---|
| DE | 101 18 392 | 11/2002 |
| EP | 0 281 906 | 11/1993 |
| JP | 7-270115 | 10/1995 |
| JP | 2003-083846 | 3/2003 |

OTHER PUBLICATIONS

P. Andretzky et al., "Modifications of the coherence radar for in vivo profilometry in dermatology", SPIE, vol. 3567, pp. 88-96, 1998.

J.E. Greivenkamp et al., "Phase Shifting Interferometry", Optical Shop Testing, Ed. D. Malacara, Second Edition 1992, pp. 501-598, Chapter 14, John Wiley & Sons, Inc., New York.

K. Creath, "Temporal Phase Measurement Methods", in "Interferogram Analysis", Digital Fringe Pattern Measurement Techniques, Ed. D.W. Robinson et al., pp. 94-140, 1993, Institute of Physics Publishing, Bristol and Philadelphia.

International Search Report for PCT/EP2006/002434, mailed Jun. 28, 2006.

Written Opinion of the International Searching Authority for PCT/EP2006/002434, mailed Jun. 28, 2006.

* cited by examiner

METHOD OF MANUFACTURING AN OPTICAL ELEMENT

The present application is a continuation-in-part of International Application No. PCT/EP2006/002434 filed Mar. 16, 2006, which was published in English, and which claims the benefit of U.S. Provisional patent application Ser. No. 60/666,175 filed Mar. 30, 2005. The entire contents of each of these applications is incorporated herein by reference.

BACKGROUND OF THE INVENTION

1. Field of the Invention

The present invention relates to the field of measuring and manufacturing of optical elements. In particular, the invention relates to a method of measuring and manufacturing an optical element having opposite first and second surfaces which are substantially flat surfaces oriented substantially parallel to each other or substantially spherical surfaces having substantially coinciding centers of curvature.

2. Brief Description of Related Art

The optical element may comprise, for example, an optical component such as a lens used in optical systems, such as telescopes used in astronomy and systems used for imaging structures, such as structures formed on a mask reticle, onto a radiation sensitive substrate, such as a resist, in a lithographic method. The success of such optical system is substantially determined by an accuracy with which the optical element can be machined or processed to have a target shape determined by a designer of the optical system. In such manufacture it is necessary to compare a shape of the processed optical surface with its target shape, and to determine differences between the processed and target surfaces. The optical element may then be further processed at those portions where differences between the machined and target surfaces exceed e.g. predefined thresholds.

In order to precisely measure the shapes of the optical surfaces of the optical element, an interferometer apparatus is commonly used. An example of such interferometer apparatus is a Fizeau interferometer. The conventional Fizeau interferometer usually includes a reference surface which is also referred to as a Fizeau surface and which is illuminated with measuring light. A portion of the measuring light is reflected back from the Fizeau surface and directed onto a camera. Another portion of the measuring light traverses the Fizeau surface and is incident on the optical surface under test to be reflected therefrom such that it is also incident on the camera. The light reflected from the Fizeau surface and the light reflected from the reference surface generate an interference pattern on the camera. By analysing this pattern, shape differences between the optical surface and its target shape can be determined in terms of wavelengths of the measuring light at respective locations on the optical surface.

If the optical element has two surfaces which are parallel to each other or which have coinciding centers of curvatures, measuring light reflected from both surfaces will be incident on the detector to interfere with the measuring light reflected from the Fizeau surface. Interference patterns generated from three interfering beams are difficult to analyze with a sufficient precision to determine shape errors of the respective optical surface to a desired accuracy. From US 2004/0190002 A1 there is known a method of suppressing a contribution of a selected optical surface of such optical element to the generated interference pattern by using measuring light of alternating wavelengths. However, this conventional method is complicated due to a necessity of a particular control of a wavelength tunable light source. Further, a thickness of the optical element may not always be determined with a desired accuracy by using the conventional methods.

SUMMARY OF THE INVENTION

The present invention has been accomplished taking the above problems into consideration.

Embodiments of the present invention provide a method of manufacturing an optical element with a relatively high accuracy.

Further embodiments of the present invention provide a method of manufacturing an optical element having flat parallel surfaces or spherical surfaces with coinciding centers of curvature.

Further embodiments of the present invention provide a method of testing an optical element having flat parallel surfaces or spherical surfaces having coinciding centers of curvatures.

Further embodiments of the present invention provide an interferometer system for testing optical elements.

Further embodiments of the present invention provide an improved interferometer system by reusing or upgrading a Fizeau interferometer apparatus.

Further embodiments of the present invention provide and use an interferometer system combining an optical delay apparatus and a Fizeau interferometer.

The optical delay apparatus used in embodiments of the present invention include at least one beam splitter and at least one reflector for providing first and second optical paths having first and second optical path lengths, respectively, experienced by a beam of light traversing the optical delay apparatus. A distance between the at least one beam splitter and the at least one reflector is adjustable for adjusting an optical path length difference between the first and second optical path lengths.

An interferometer apparatus used in embodiments of the present invention includes an interferometer optics, a first reference surface, which may in some configurations be referred to as a Fizeau surface, and a second reference surface disposed at a distance from the first reference surface to form a cavity therebetween. The term Fizeau interferometer designates in the art a common path interferometer in which two interfering beams, which are commonly referred to as a measuring beam and a reference beam, travel a common path and are separated from each other by a surface reflecting back the reference beam along the common path.

The interferometer apparatus further comprises a light source and a position sensitive detector including a light detecting surface. The light source is configured to generate light of a short coherence length.

The light source, the optical delay apparatus, the interferometer apparatus and the detector are arranged such that measuring light generated by the light source may traverse the optical delay apparatus and the interferometer apparatus to be incident on the detector. Herein, the optical delay apparatus may be disposed upstream or downstream of the interferometer.

The components are further arranged such that a portion of the measuring light traversing the interferometer apparatus is reflected from the first reference surface and images the first reference surface onto the detector through the interferometer optics. Further, a second reference surface is arranged such that a portion of the measuring light traversing the first reference surface is reflected from the reflector and also imaged onto the detector through the interferometer optics.

The combination of the optical delay apparatus and the interferometer apparatus used in embodiments of the present invention is particularly suitable for testing optical elements generating multiple reflected beams of measuring light imaged onto the light detecting surface of the position-sensitive detector. Due to the short coherence length of the measuring light it is possible to select particular surfaces of the optical element to contribute to the interference pattern formed on the light detecting surface by adjusting the optical path length difference of the optical delay apparatus.

According to an exemplary embodiment of the invention, the optical delay apparatus is disposed upstream of the Fizeau interferometer and supplies the measuring light to the Fizeau interferometer through an aberration reducing transfer optics. The aberration reducing transfer optics is configured to transfer the light having traversed the two different optical paths in the optical delay apparatus to the Fizeau interferometer such that aberration differences between the light having traversed a first optical path in the optical delay apparatus and light having traversed a different second optical path in the optical delay apparatus are reduced. For this purpose, the optical transfer apparatus may comprise a mono mode optical fiber which is capable of transferring substantially only one single mode of each of the light having traversed the first and second optical paths, thus eliminating aberration differences which could occur if more than one mode were transmitted by the optical transfer apparatus.

With such arrangement it is further possible to handle the Fizeau interferometer and the optical delay apparatus as separate groups of components such that a particular arrangement and position of the optical delay apparatus relative to the Fizeau interferometer does not have to be maintained. Further, it is possible to upgrade a conventional interferometer system comprising a Fizeau interferometer and a laser light source by replacing the existing laser light source with the optical delay apparatus supplying measuring light generated by the short coherence length light source through the optical fibre.

According to an exemplary embodiment of the present invention, there is provided a method of manufacturing an optical element having opposite first and second surfaces using the above interferometer system by (a) disposing the optical element within the cavity such that the first surface of the optical element is oriented towards the first reference surface and the second surface of the optical element is oriented towards the second reference surface, such that at least portions of the first and second surfaces of the optical element are each imaged onto the portion of the light detecting surface of the detector with measuring light, and (b) adjusting the optical path length difference of the optical delay apparatus to be substantially equal to an optical path difference between the first reference surface and the first surface of the optical element, and detecting at least one first interference pattern generated by measuring light reflected from the first reference surface which is superimposed on the portion of the light detecting surface of the detector with measuring light reflected from the first surface of the optical element;

(c) adjusting the optical path length difference of the optical delay apparatus to be substantially equal to an optical path difference between the second surface of the optical element and the second reference surface, and detecting at least one second interference pattern generated by measuring light reflected from the second surface of the optical element which is superimposed on the portion of the light detecting surface of the detector with measuring light reflected from the second reference surface;

(e) processing at least one of the first and second surfaces of the optical element based on the at least one first and the at least one second interference pattern.

With such method the second surface of the optical element is tested in a configuration where both interfering beams of measuring light, i.e. the beam reflected from the second surface of the optical element and the beam reflected from the second reference surface, traverse a substrate material of the optical element. In other words, the substrate material of the optical element is disposed in a common path portion of the interfering beams and does not contribute by inhomogeneities of its refractive index or other effects to a measuring result.

It is thus possible to determine a distance between the first and second optical surfaces, which corresponds to a thickness of the optical element, at plural locations across the optical element with a high accuracy.

According to an exemplary embodiment of the invention, the method comprises adjusting the optical path length difference of the optical delay apparatus to be substantially equal to an optical path difference between the first reference surface and the second reference surface, and detecting, while the optical element is not disposed in the cavity, at least one third interference pattern generated by measuring light reflected from the first reference surface which is superimposed on the portion of the light detecting surface of the detector with measuring light reflected from the second reference surface, and determining further parameters of the optical element based on the detected at least one third interference pattern.

According to a further exemplary embodiment of the invention, the method comprises, while the optical element is disposed within the cavity, adjusting the optical path length difference of the optical delay apparatus to be substantially equal to an optical path difference between the first reference surface and the second reference surface, detecting at least one fourth interference pattern generated by measuring light reflected from the first reference surface which is superimposed on the portion of the light detecting surface of the detector with measuring light reflected from the second reference surface, and determining parameters of the optical element based on the detected at least one fourth interference pattern.

According to a further exemplary embodiment of the invention, the method comprises adjusting the optical path length difference of the optical delay apparatus to be substantially equal to an optical path difference between the first and second surfaces of the optical element, detecting at least one fifth interference pattern generated by measuring light reflected from the first surface of the optical element which is superimposed on the portion of the light detecting surface of the detector with measuring light reflected from the second surface of the optical element, and determining parameters of the optical element based on the detected at least one fifth interference pattern.

According to a further exemplary embodiment of the invention, the method comprises adjusting the optical path length difference of the optical delay apparatus to be substantially equal to an optical path difference between the first reference surface and the second surface of the optical element, detecting, while the optical element is disposed in the cavity, at least one sixth interference pattern generated by measuring light reflected from the first reference surface which is superimposed on the portion of the light detecting surface of the detector with measuring light reflected from the second surface of the optical element and determining parameters of the optical element based on the detected at least one sixth interference pattern.

According to a further exemplary embodiment of the invention, the method comprises adjusting the optical path length difference of the optical delay apparatus to be substantially equal to an optical path difference between the first surface of the optical element and the second reference surface, detecting, while the optical element is disposed in the cavity, at least one seventh interference pattern generated by measuring light reflected from the first surface of the optical element which is superimposed on the portion of the light detecting surface of the detector with measuring light reflected from the second reference surface and determining parameters of the optical element based on the detected at least one sixth interference pattern.

According to an exemplary embodiment of the invention, the optical delay apparatus includes one beam splitter and two retro-reflectors.

According to another exemplary embodiment of the invention, the optical delay apparatus includes a distance measuring system for measuring changes of a position of the at least one beam splitter relative to the at least one reflector. The position measuring system may comprise a laser interferometer or other suitable distance measuring system.

According to an embodiment of the invention, the method of manufacturing the optical element comprises a processing of the first or second optical surfaces of the optical element or both surfaces by at least one of milling, grinding, loose abrasive grinding, polishing, ion beam figuring, magneto-rheological figuring, and finishing of the respective optical surface of the optical element. According to a particular embodiment herein, the finishing comprises applying a coating to the optical surface, and the coating may comprise at least one of a reflective coating, an anti-reflective coating and a protective coating.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF AN EXEMPLARY EMBODIMENT

In the exemplary embodiment shown in the Figures and explained below, components that are alike in function and structure are designated as far as possible by alike reference numerals. Therefore, to understand the features of the individual components of a specific embodiment, the descriptions of other embodiments and of the summary of the invention should be referred to.

Figure 1:
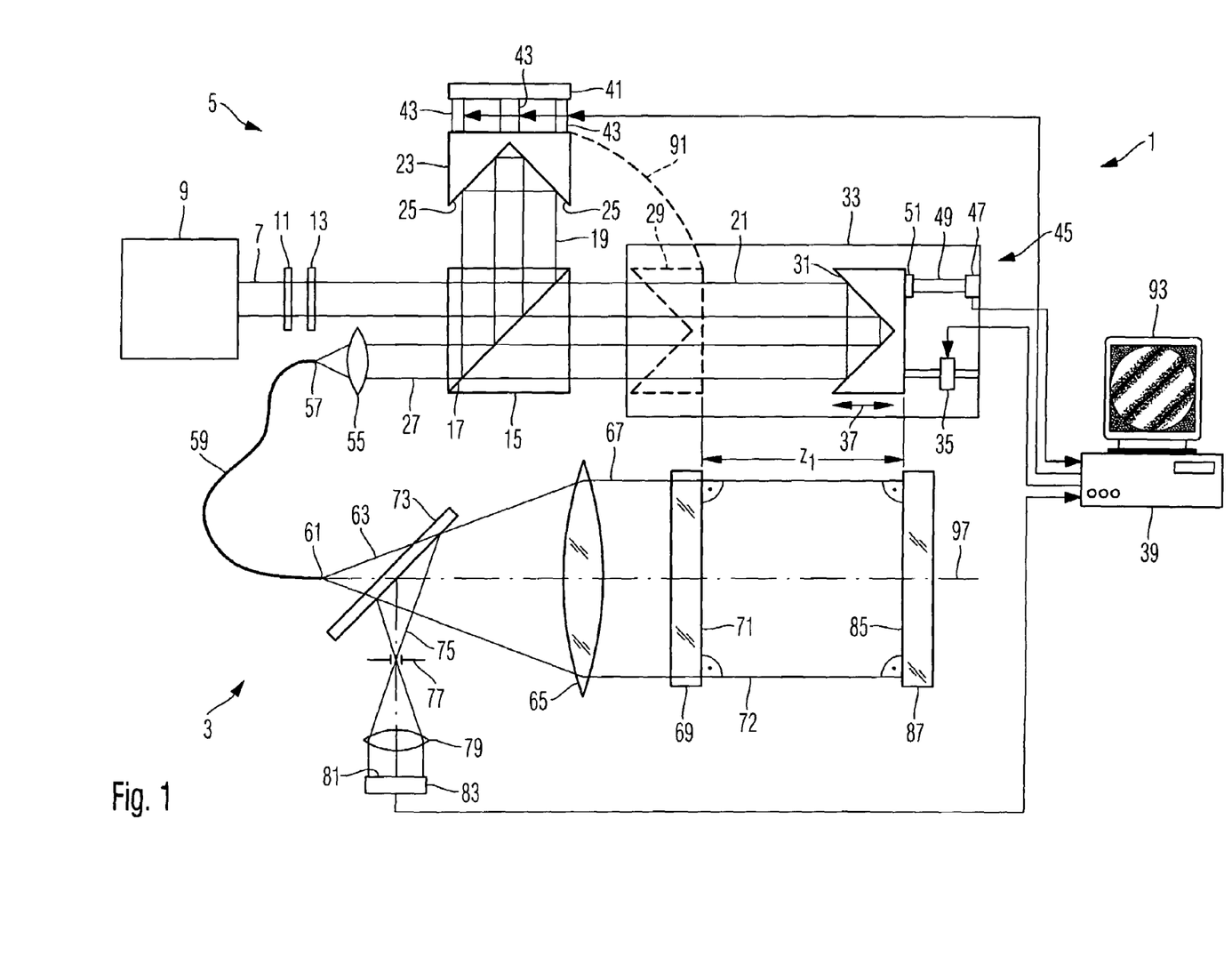
FIG. 1 is a schematic illustration of an interferometer system according to an embodiment of the invention in a configuration used in a method of manufacturing an optical element according to an embodiment of the invention.

FIG. 1 is a schematic illustration of an interferometer system 1 used for measuring an optical element. The interferometer system 1 comprises as main groups of components a Fizeau interferometer 3 and an optical delay apparatus 5. A linear polarized beam 7 of measuring light is generated by a light source 9, such as a super-luminescence diode generating light of wavelengths of about 50 μm having a coherence length of about 680 nm. The beam 7 traverses an adjustable attenuating filter 11 to provide a desired beam intensity. The beam 10 traverses a half-wave plate 13 to orient a polarization direction of the light of beam 7 traversing the half-wave plate to be oriented under 45° relative to the paper plane of FIG. 1. The beam 7 then enters the optical delay apparatus 5 through a polarizing beam splitter 15 having a beam splitting interface 17 splitting the beam into a portion 19 reflected from interface 17 and a portion 21 traversing interface 17.

Beam 19 is incident on a retro-reflector 23 having three reflecting surfaces 25 oriented orthogonally to each other to be reflected therefrom such that it enters the beam splitter 15 and is again reflected from interface 17 as a beam 27.

Beam 21 having traversed the interface 17 is reflected from a retro-reflector 29 having three orthogonally oriented reflecting surfaces 31, enters the beam splitter 15 again and traverses the interface 17 to coincide with beam 27.

Retro-reflector 29 is mounted on a linear translation table 33 comprising an actuator or motor 35 to displace the retro-reflector 29 in a direction 37 oriented parallel to beam 21. Motor 35 is controlled by a computer 39 to change an optical path which beam 21 experiences between traversing the interface 17 the first time and traversing the interface 17 the second time.

Retro-reflector 23 is mounted in the present embodiment on a support 41 via three piezoelectric elements 43 which are also controlled by computer 39 to adjust an orientation of retro-reflector 23 and to perform a fine adjustment of an optical path which beam 19 experiences between its first reflection from interface 17 and its second reflection therefrom. Any other suitable number of piezoelectric elements may be used for mounting retro-reflector.

With the above arrangement, a first portion 19 of beam 27 having traversed the optical delay apparatus 5 has experienced an optical path length which is shorter than an optical path length experienced by a second portion 21 of beam 27. In other words, the optical delay apparatus 5 provides an optical path length difference to beam 27 having traversed the apparatus 5. The optical path length difference may be adjusted under the control of computer 39 by controlling the piezoelectric actuators 43 and the motor 35. The linear translation table 33 further comprises a distance measuring system 45 comprising a measuring interferometer 47 emitting a measuring beam 49 which is directed onto a mirror 51 fixed to a backside of retro-reflector 29 to detect a translational position of retro-reflector 29 on linear translation table 33, wherein detection signals of interferometer 47 are supplied to the computer 39.

The beam 27 of measuring light having traversed the optical delay apparatus is focused by a collimating lens 55 onto a first end 57 of a mono-mode optical fiber 59 which supplies the measuring light 27 to the Fizeau interferometer 3. Optionally, a linear polarizer may be inserted between the beam splitter 15 and the collimating lens 55 in order to improve the interference modulation and its temporal stability. The supplied light is emitted from a second end 61 of optical fiber 59 as a diverging beam of measuring light having substantially spherical wavefronts which traverses a beam splitter 73 and is collimated by an interferometer optics 65 to form a parallel beam 67 of measuring light having substantially flat wavefronts. The interferometer optics 65 is shown in FIG. 1 as one single lens and may comprise one or plural suitably formed lens elements.

The beam 67 of measuring light emitted from the interferometer optics 65 traverses a slightly wedge shaped plate 69 having a partially reflecting flat reference surface 71 oriented orthogonal to parallel beam 67. A portion of measuring light 67 reflected from surface 71 travels back to the interferometer optics 65 to be reflected from the beam splitter 73. Reflected beam 75 traverses an aperture of a beam stop 77 for intercepting stray light, and traverses a camera optics 79 to be incident on a light detecting surface 81 of a detector 83. The interferometer optics 65 and camera optics 79 are arranged such that the reference surface 71 is imaged onto the light detecting surface 81 of detector 83.

A portion 72 of beam 67 traversing surface 71 is orthogonally incident onto a reference surface 85 of a mirror 87. The measuring light reflected from the reference surface 85 travels back to traverse plate 69, the interferometer optics 65 and camera optics 79 to be also incident on the light detecting surface 81 of detector 83. Thus, also the reference surface 85 of the mirror 87 is imaged onto the light detecting surface 81 of the detector 83 by the interferometer optics 65 and the camera optics 79. A detected image of detector 83 is supplied to computer 39.

The reference surface 85 is disposed at a distance $z_1$ from reference surface 71 such that a cavity is formed therebetween. As a consequence, the portion 72 of the beam 67 of measuring light reflected from reference surface 85 experiences an optical path difference $2 \cdot z_1$ relative to the portion of the beam 67 of measuring light reflected from reference surface 71.

FIG. 1 indicates in broken lines the retro-reflector 29 disposed at a position on the linear translation table 33 such that the beams 19 and 21 experience substantially same optical path lengths in the optical delay apparatus 5 as also indicated by circle 91. In other words, if the retro-reflector 29 is disposed in the position shown in broken lines in FIG. 1, the optical delay apparatus will provide an optical path length difference of zero. If the retro-reflector 29 is disposed in the position indicated in solid lines in FIG. 1, the optical delay apparatus will provide an optical path length difference which is equal to the optical path length $2 \cdot z_1$ of the cavity formed between reference surfaces 71 and 85. With the optical path length difference adjusted to be substantially equal to the optical path length $2 \cdot z_1$ of the cavity, the short coherence measuring light will generate an interference pattern on the light detecting surface 81 of detector 83 as schematically indicated in FIG. 1 on a monitor 93 of computer 39. If the optical path length difference provided by the optical delay apparatus is substantially different from the length $2 \cdot z_1$, an interference pattern of a substantial contrast will not be formed on the light detecting surface 81 of a detector 83 due to the short coherence length of the measuring light.

Figure 5:
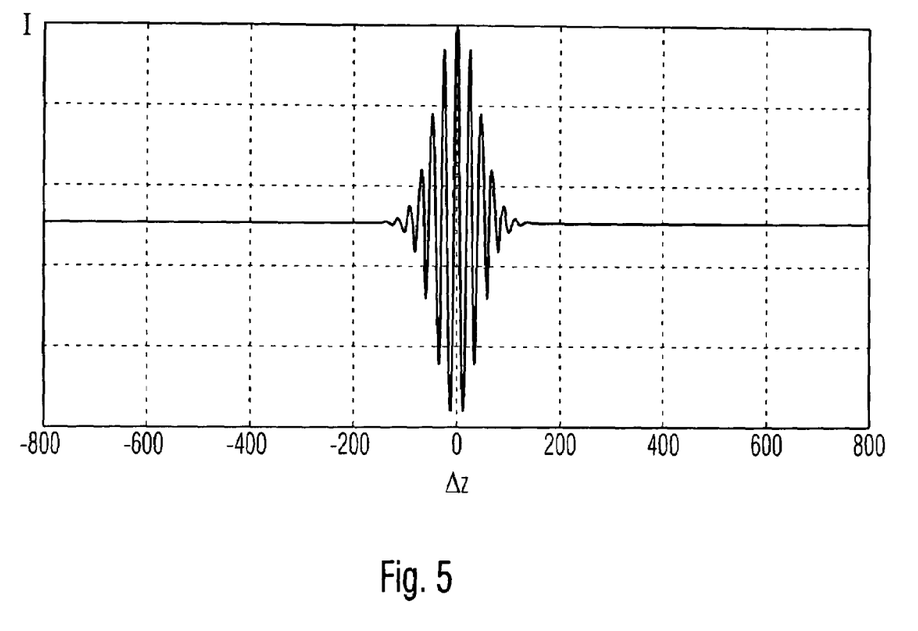
FIG. 5 shows a dependency of a detector signal generated in the interferometer system shown in FIGS. 1 and 2.

The generation of the interference pattern is further illustrated with reference to FIG. 5 below. FIG. 5 shows an intensity $I(\Delta z)$ detected by a pixel of detector 83 in dependence of a difference $\Delta z$ between the optical path length difference provided by the optical delay apparatus 5 and the length $2 \cdot z_1$ of the cavity formed between surface 71 and surface 85. The intensity I is a maximum intensity at $\Delta z=0$ and oscillates with increasing absolute values of $\Delta z$, wherein an amplitude of the oscillation continuously disappears with increasing absolute values of $\Delta z$. An envelope fitted to the maxima of $I(\Delta z)$ has a half width corresponding to the coherence length of the measuring light.

An interferometric measurement of surface 71 relative to surface 85 is performed as follows:

The retro-reflectors 23 and 29 are generally not disposed relative to the beam splitter 15 such that the optical delay apparatus provides exactly that optical path length difference which is necessary to fulfil $\Delta z=0$. Therefore, the motor 35 will be controlled such that the retro-reflector 29 is slowly moved in the direction 37, and a light intensity I detected by one exemplary pixel, e.g. a pixel disposed on an optical axis 97 of the Fizeau interferometer 3, is detected by computer 39. The movement of the retro-reflector 29 and scanning the detected intensity I is continued in order to find that position of retro-reflector 29 at which the intensity I is a maximum intensity indicating that the condition $\Delta z=0$ is fulfilled for the exemplary pixel. Since the surface 71 and the surface 85 are not perfectly flat and not oriented perfectly parallel to each other, this condition will not be exactly fulfilled for other pixels of the detector 83, and the detected image of the detector 83 will be a modulated interference pattern as schematically indicated on monitor 93 in FIG. 1. Such interference pattern represents a distribution of optical path length differences across measuring beam 67 and between surfaces 71 and 85.

The distribution of optical path length differences may be derived from an analysis of the interference pattern, accordingly. For improving such analysis based on the detected interference pattern various methods are known in the art. In the illustrated embodiment of the invention, a phase shifting interferometry (PSI) method is used. The piezoelectric actuators 43 are controlled such that the optical path length difference provided by the optical delay apparatus is changed in two steps corresponding to one quarter of the wavelength of the measuring light, and the generated interference pattern at each of the resulting three optical path differences are detected. From such detected interference patterns the distribution of the optical path differences may be determined to a high accuracy. Background information of phase shifting interferometery is available from the articles by J. E. Greivenkamp et al. at "Phase shifting interferometry" in optical Shop Testing edited by D. Malacara, 2nd edition, Wiley Interscience Publication (1992), and Catherine Creath "Temporal Phase Measurement Methods" in Interferogram Analysis, Digital Fringe Pattern Measurement Techniques, edited by D. W. Robinson et al., Institutes of Physics Publishing, Bristol and Philadelphia, 1993. These articles are incorporated herein by reference. A further method of phase shifting interferometry is known from U.S. patent application Ser. No. 11/027,989 entitled "Phase Shifting Interferometric Method, Interferometer Apparatus and Method of Manufacturing an Optical Element" by Bernd Doerband and Stefan Schulte, filed on Jan. 4, 2005. The entire contents of this document are incorporated herein by reference.

Figure 2:
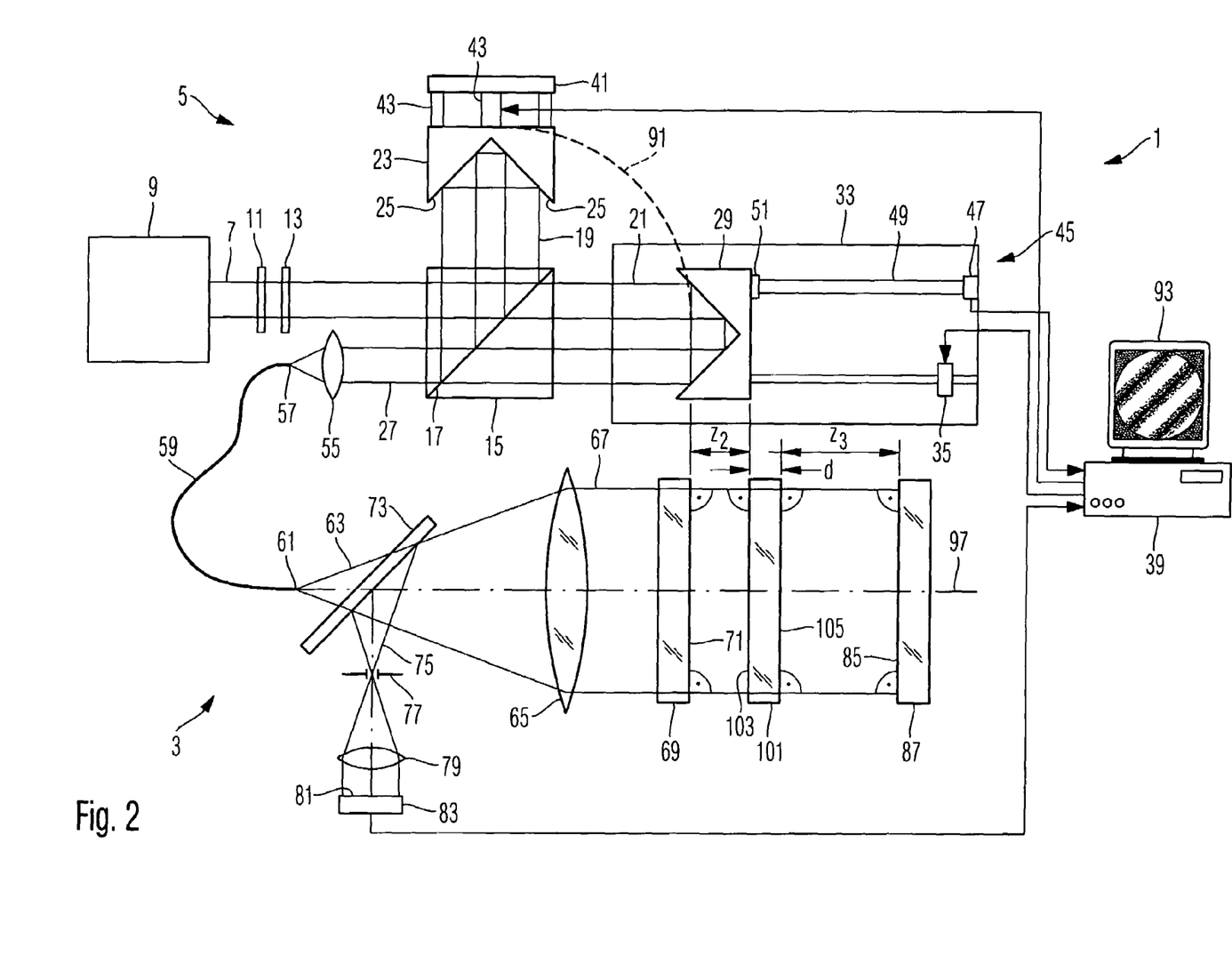
FIG. 2 shows the interferometer system of FIG. 1 in a further configuration used in the method of manufacturing the optical element.

FIG. 2 shows an optical element 101 to be tested disposed in the cavity between reference surface 71 and surface 85. The optical element 101 is a glass substrate having a first surface or front surface 103 oriented towards the reference surface 71, and a second surface or back surface 105 oriented towards reference surface 85.

Figure 3:
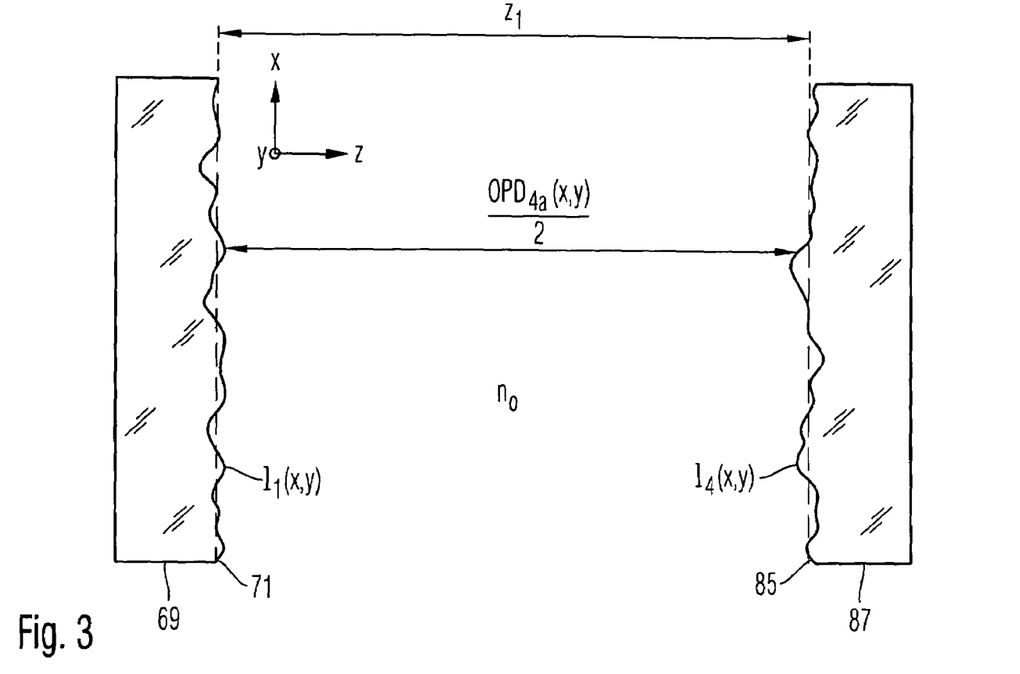
FIG. 3 is an exaggerated representation of a detail of FIG. 1.
Figure 4:
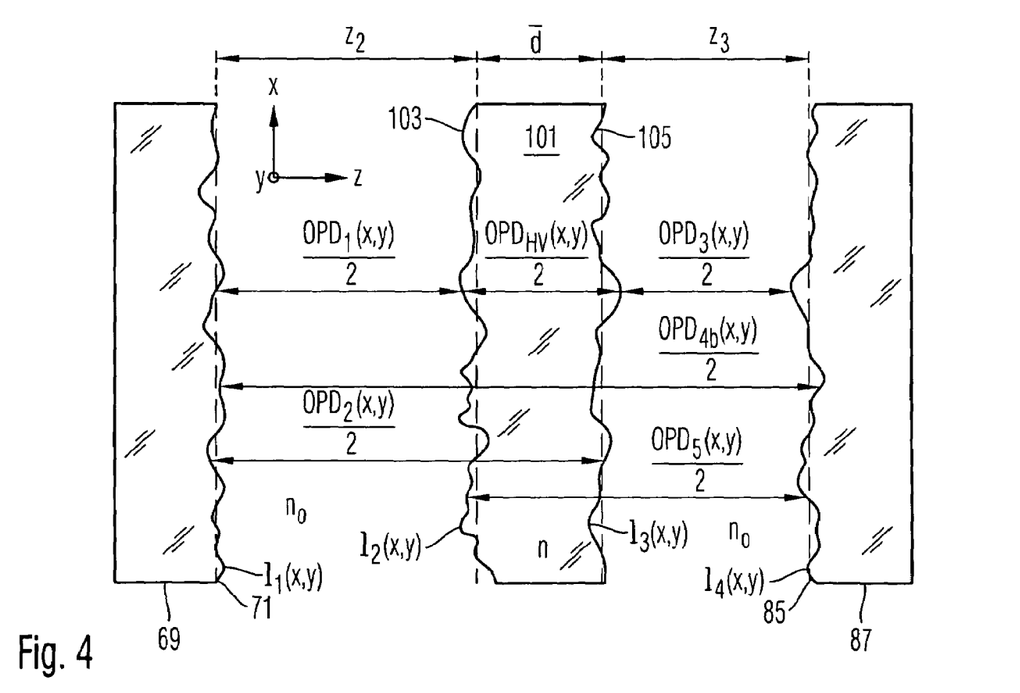
FIG. 4 is an exaggerated representation of a detail of FIG. 2.

FIG. 3 is a schematic illustration of a detail of FIG. 1 showing the cavity formed between the first reference surface 71 and the second reference surface 85 wherein deviations of these surfaces from their perfectly flat shape are exaggerated for illustration purposes. Similarly, FIG. 4 shows the detail corresponding to FIG. 2 wherein the optical element is disposed within the cavity formed by the first reference surface 71 and the second reference surface 85. FIGS. 3 and 4 also illustrate a terminology used in the illustration of the various measurements performed in the embodiment of the invention.

A first interferometric measurement is performed as follows:

The retro-reflector 29 is positioned such that the optical path length difference generated by the optical delay apparatus 5 is substantially equal to an optical path difference between reference surface 71 and front surface 103 of the optical element, which is twice a distance $z_2$ between reference surface 71 and front surface 103 of the optical element 101. A distribution $OPD_1$ of the optical path differences between surfaces 71 and 103 is determined by a first interferometric measurement. This distribution $OPD_1$ of path differences may be represented as $$OPD_1 = 2(l_2 - l_1), \tag{1}$$

wherein
$l_1(x,y)$ represents the shape of the reference surface 71, and
$l_2(x,y)$ represents the shape of surface 103 of the optical element.

Thereafter, the retro-reflector 29 is moved to a position such that the optical path length difference generated by the optical delay apparatus is substantially equal to an optical path difference between reference surface 71 and back surface 105 of the optical element 101. A second interferometric measurement is performed in this configuration, and a distribution $OPD_2$ of the optical path differences between the reference surface 71 and the back surface 105 is calculated. This distribution $OPD_2$ of optical path differences may be represented as $$OPD_2 = 2(l_2 - l_1) + 2n(l_3 - l_2), \tag{2}$$

wherein
$l_3(x,y)$ represents the shape of the surface 105,
$l_2(x,y)$ represents the shape of the surface 103,
$l_1(x,y)$ represents the shape of the reference surface 71, and
$n(x,y)$ represents a refractive index of the substrate material of optical element 101.

Thereafter, the retro-reflector 29 is moved to a position such that the optical path length difference generated by the optical delay apparatus is substantially equal to an optical path difference between back surface 105 and reference surface 85, which is twice a distance $z_3$ between the back surface 105 and the reference surface 85. A third interferometric measurement is performed to determine a distribution $OPD_3$ of the optical path differences between back surface 105 and reference surface 85. The distribution $OPD_3$ may be represented as $$OPD_3 = 2(l_4 - l_3), \tag{3}$$

wherein
$l_3(x,y)$ represents the shape of the surface 105, and
$l_4(x,y)$ represents the shape of the reference surface 85.

Thereafter, the retro-reflector 29 is moved to a position such that the optical path length difference provided by the optical delay apparatus 5 is substantially equal to an optical path length between reference surface 71 and reference surface 85, wherein beam 67 traverses the optical element 101, and a fourth interferometric measurement is performed in this configuration. A determined distribution $OPD_{4b}$ of corresponding optical path differences may be represented as follows:

$$OPD_{4b} = 2(l_2 - l_1) + 2n(l_3 - l_2) + 2(l_4 - l_3), \tag{4}$$

wherein
$l_1(x,y)$ represents the shape of the surface 71,
$l_2(x,y)$ represents the shape of surface 103,
$l_3(x,y)$ represents the shape of the surface 105, and
$l_4(x,y)$ represents the shape of the reference surface 85.

Thereafter, the retro-reflector 29 is moved to a position such that the optical path length difference provided by the optical delay apparatus is substantially equal to an optical path difference between the front surface 103 and the back surface 105 of the optical element 101, and a fifth interferometric measurement is performed in this configuration to determine a corresponding distribution $OPD_{HV}$ of optical path length differences which may be represented as $$OPD_{HV} = 2n(l_3 - l_2), \tag{5}$$

wherein
$l_3(x,y)$ represents the shape of the surface 105,
$l_2(x,y)$ represents the shape of the surface 103, and
$n(x,y)$ represents a refractive index of the substrate material of optical-element 101.

Thereafter, the retro-reflector 29 is moved to a position such that the optical path length difference provided by the optical delay apparatus is substantially equal to an optical path difference between the front surface 103 of the optical element 101 and the second reference surface 85, and a sixth interferometric measurement is performed in this configuration to determine a corresponding distribution $OPD_5$ of optical path length differences which may be represented as $$OPD_5 = 2n(l_3 - l_2) + 2(l_4 - l_3), \tag{6}$$

wherein
$l_3(x,y)$ represents the shape of the surface 105,
$l_2(x,y)$ represents the shape of the surface 103,
$l_4(x,y)$ represents the shape of the reference surface 85, and
$n(x,y)$ represents a refractive index of the substrate material of optical element 101.

Thereafter, the optical element 101 is removed from the cavity formed between front surface 71 and reference surface 85, and the retro-reflector 29 is moved to the position as illustrated in FIG. 1 such that the optical path length difference provided by the optical delay apparatus 5 is substantially equal to the optical path difference between surfaces 71 and 85, which is twice the distance $z_1$ between surfaces 71 and 85. A seventh interferometric measurement is performed in this configuration, and a distribution $OPD_{4a}$ of the corresponding path length differences may be represented as $$OPD_{4a} = 2(l_4 - l_1), \tag{7}$$

wherein
$l_1(x,y)$ represents the shape of the reference surface 71, and
$l_4(x,y)$ represents the shape of the reference surface 85.

From the above illustrated measurements and determinations of optical path length differences, the following parameters of the optical element 101 may be determined:

A distribution of the thickness d(x,y) of the optical element 101 may be calculated according to the formula $$d = \frac{1}{2}(OPD_{4a} - OPD_1 - OPD_3). \tag{8}$$

It is to be noted that the above equation (8) representing the thickness of the optical element is independent of the refractive index of the substrate material and of deviations therefrom. Thus, the thickness of the optical element 101 may be determined with a high accuracy from the above illustrated measurements and without previous knowledge of other parameters.

Alternatively or in addition thereto, the distribution of the thickness d(x,y) of the optical element 101 may be calculated according to the formula $$d = -\frac{1}{2}(OPD_{4b} - OPD_{4a} - OPD_{HV}). \tag{9}$$

According to a further additional or alternative method, the distribution of the thickness d(x,y) of the optical element 101 may be calculated according to the following formula:

$$d = -\frac{1}{2}(2OPD_{4b} - OPD_{4a} - OPD_2 - OPD_5) \tag{10}$$

The surface shapes of surfaces 103 and 105 may be determined according to the following formulas $$l_2 = \frac{1}{2}(OPD_1 - OPD_{4a}) - l_4 + const \tag{11}$$

and $$l_3 = -\frac{1}{2}OPD_3 + l_4 + const. \tag{12}$$

The surface shape of the first reference surface 71 may be determined according to the following formula $$l_1 = -\frac{1}{2}OPD_{4a} + l_4 + const. \tag{13}$$

The value of n(x,y) representing the refractive index of the substrate material of the optical element 101 may be determined according to the following formula:

$$n = 1 + \frac{1}{2d}(OPD_{4b} - OPD_{4a}). \tag{14}$$

Herein, the thickness d(x,y) of the optical element 101 may be calculated according to the formula (8). It is to be noted that the calculation of the refractive index n(x,y) of the optical element is advantageously possible due to the independence of the calculation of the geometrical thickness d(x,y) according to formula (8) and the calculation of the optical thickness n(x,y) according to formula (14).

The average refractive index $\bar{n}$ of the optical element can be determined by averaging n(x,y) over its cross section:

$$\bar{n} = \left\langle 1 + \frac{OPD_{4b} - OPD_{4a}}{2d} \right\rangle_{x,y}. \tag{15}$$

The variation of the refractive index Δn(x,y) of the optical element 101 across the cross section of beam 67 may be determined according to the following formula:

$$\Delta n = n - \bar{n} = \frac{1}{2d}\bar{n}(OPD_{4b} - OPD_{4a}) - (\bar{n} - 1)OPD_{HV}. \tag{16}$$

It appears that some of these formulas require knowledge of $l_4$(x,y) which is the shape of the second reference surface 85. This shape is to be determined by an independent calibrating measurement, accordingly. One suitable method of determining the shape or surface error of reference surface 85 is illustrated in U.S. patent application Ser. No. 10/637,217. The entire contents of this document are incorporated herein by reference.

It is to be noted that it is not necessary to perform each of the above illustrated measurements and to determine each of the distributions $OPD_1$, $OPD_2$, $OPD_3$, $OPD_{4a}$ and $OPD_{4b}$ accordingly. It is possible to perform only a subset of these measurements which is necessary to determine only selected ones of the desired properties $l_2$, $l_3$, d, n and Δn of the optical element.

A method of manufacturing the optical element 101 to have a substantially constant thickness and substantially flat surfaces 103 and 105 is illustrated with reference to the flowchart shown in FIG. 7 below.

After starting the procedure, the optical element 101 is arranged in the cavity between reference surfaces 71 and 85 in a step 202. Thereafter, the distributions $OPD_1$ (equation (1)), $OPD_2$ (equation (2)), $OPD_3$ (equation (3)), $OPD_{4b}$ (equation (4)), $OPD_5$ (equation (7)), and $OPD_{HV}$ (equation (5)) are determined in steps 204 to 212.

Thereafter, the optical element is removed from the cavity in a step 214, and a distribution $OPD_{4a}$ (equation (6)) is determined in a step 216.

A distribution of the thickness d (equation (8), (9) and/or (10)) of the optical element and/or of the shape errors of $l_2$, $l_3$ (equation (11), (12)) of the surfaces 103, 105 of the optical element 101 are determined in a step 218 based on the determined distributions $OPD_1$, $OPD_2$, $OPD_3$, $OPD_{4b}$, $OPD_{HV}$, $OPD_5$ and $OPD_{4a}$. In a step 220, deviations of the thickness of the optical element from a desired thickness and/or deviations of the surfaces shapes of surfaces 103 and 105 from their target shapes are determined. In a step 222, a decision is made as to whether the tested optical element corresponds to its specification. This specification may comprise a requirement for the thickness of the optical element without particular requirements for the shapes of the surfaces 103, 105, or the specification may comprise requirements for the shapes of surfaces 103 and 105 or both.

If the differences are below suitably chosen thresholds, a finishing step 224 is performed on the optical surfaces 103, 105. The finishing may include a final polishing of the surface or depositing a suitable coating, such as a reflective coating, an anti-reflective coating, and a protective coating applied to the optical surface by suitable methods, such as sputtering. The reflective coating may comprise, for example, a plurality of layers, such as ten layers of alternating dielectric materials, such as molybdenum oxide and silicon oxide. Thicknesses of such layers may be about 5 nm and will be adapted to a wavelength to be reflected from the optical surface, such that a reflection coefficient is substantially high. Finally, the reflective coating may be covered by a protective cap layer for passivating the reflective coating. The cap layer may include a layer formed by depositing materials such as ruthenium. The anti-reflective coating which is intended to reduce reflections of radiation from the optical surface of the optical element, such as a lens element, may include materials, such as magnesium fluoride, lanthanum oxide and other suitable materials. Also the anti-reflective coating may be passivated by a protective cap layer.

If the determined differences are below the thresholds in step 222, the procedure is continued at a step 226 of processing the optical surface. For this purpose, the optical element is removed from the beam path of the interferometer apparatus and mounted on a suitable machine tool to remove those surface portions of the optical surface at which differences between the determined surface shape and the target shape exceed the threshold. Thereafter, the procedure is continued at step 202, and the optical element is again mounted in the beam of measuring light in the interferometer apparatus, and the measurement of the surface shape of the optical surfaces and/or the thicknesses of the optical element and processing is repeated until the differences are below the thresholds.

The processing may include operations such as milling, grinding, loose abrasive grinding, polishing, ion beam figuring and magneto-rheological figuring.

After the optical surface is finished in step 224, the optical element is delivered and incorporated in an optical system in a step 228. Thereafter a next optical element 101 to be tested is mounted in the interferometer beam path in a step 202 and repeated measuring and machining of such next optical element is performed until this surface fulfils the specifications.

The above threshold values will depend on the application of the optical surface in the optical system for which it is designed. For example, if the optical surface is a lens surface in an objective for imaging a reticle structure onto a resist with radiation of a wavelength λ=193 nm, such threshold value may be in a range of about 1 nm to 10 nm. It is to be noted that it is not necessary that the above mentioned thresholds are constant thresholds over the whole area of the optical element. It is possible that the threshold is dependent on e.g. a distance from a center of the optical surface or some other parameters. In particular, plural thresholds may be defined each for different ranges of spatial frequencies of differences between the measured surface and its target shape.

Figure 6:
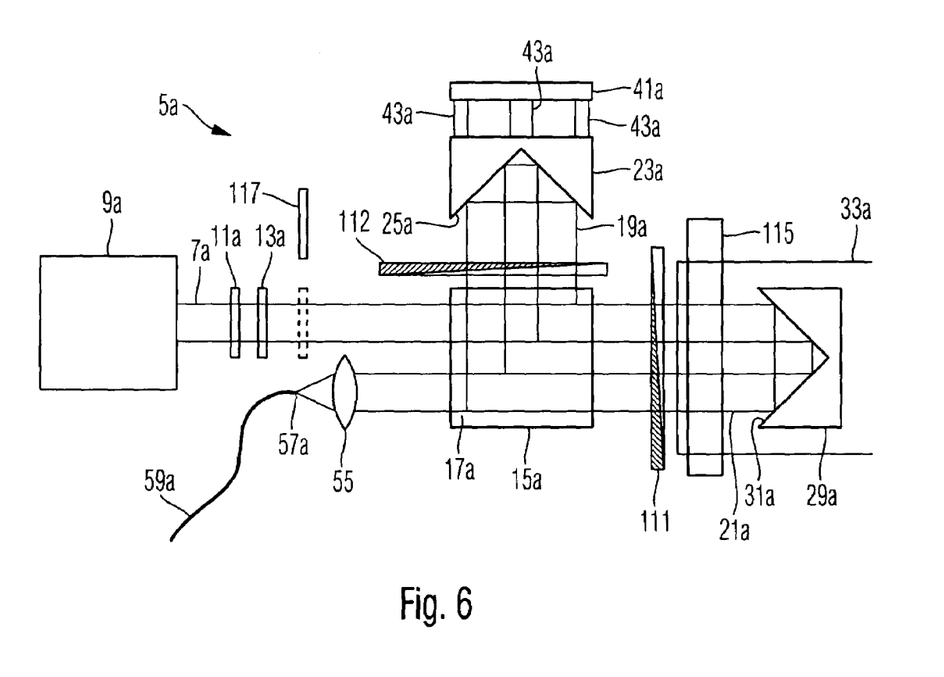
FIG. 6 is a schematic illustration of a portion of an interferometer system according to a further embodiment of the present invention.

FIG. 6 illustrates an embodiment of an optical delay apparatus 5a which is similar to the optical delay apparatus shown in FIGS. 1 and 2. However, the optical delay apparatus 5a shown in FIG. 6 comprises adjustable light attenuators 111 and 112 disposed in beams 21a and 19a, respectively, for adjusting relative intensities of the beams 21a and 19a. The attenuators 111, 112 are schematically represented as wedge shaped grey portions in FIG. 6 and may be embodied in detail by any suitable filter or other to absorb a respective adjustable portion of light intensity of the beam. A relative adjustment of intensities of beams 21a and 19a is of advantage if reflectivities of the measured surfaces in the Fizeau interferometer are different. By adjusting relative beam intensities in the optical delay apparatus 5a, it may be achieved that the two beams reflected in the Fizeau interferometer and contributing to the detected interference patterns have substantially same intensities, resulting in an improved modulation or contrast of the generated interference patterns.

Figure 7:
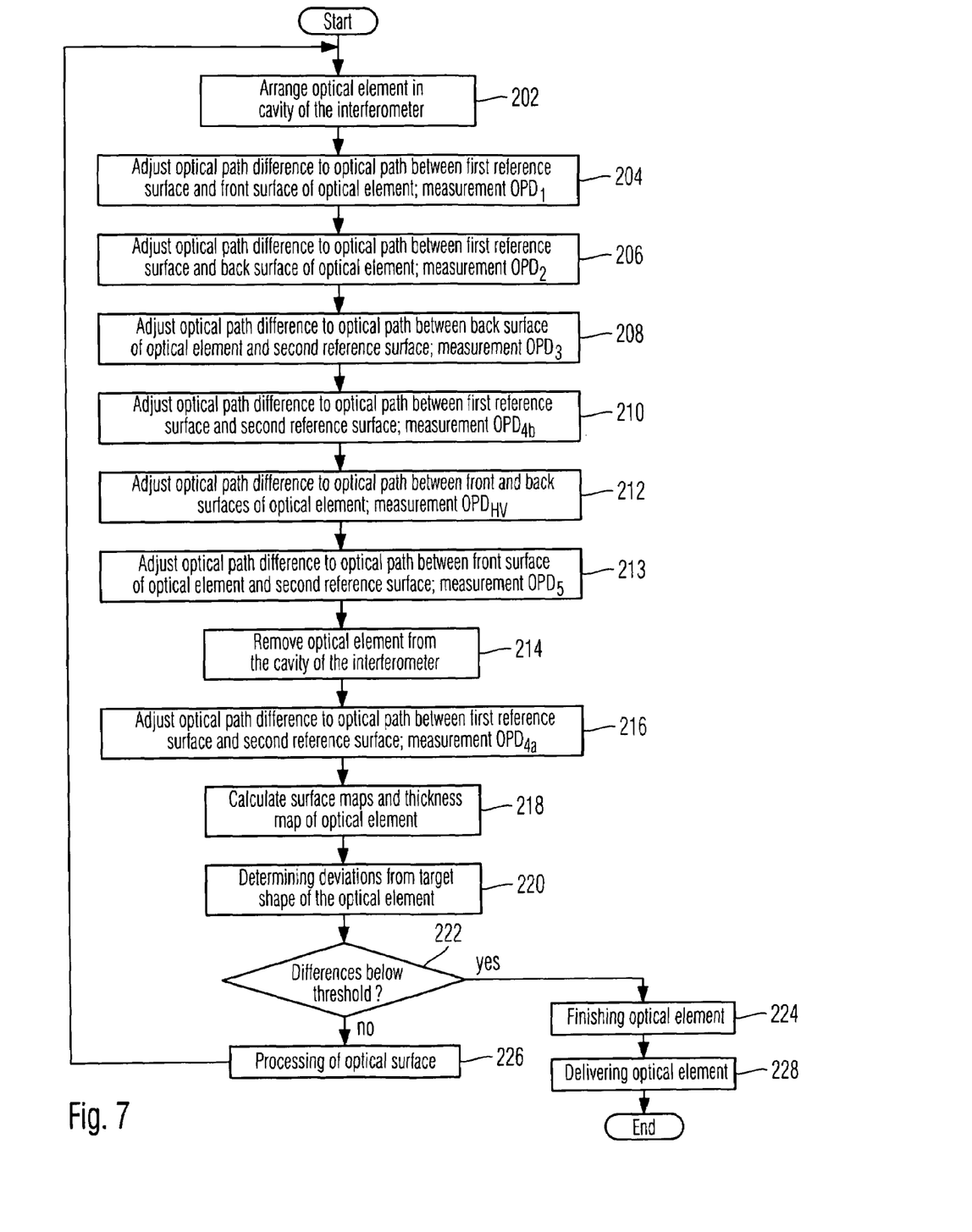
FIG. 7 is a flowchart of the method for manufacturing the optical element according to an embodiment of the present invention.

The optical delay apparatus 5a further comprises a plate 115 which is disposed in beam 21a during the PSI measurements performed in steps 208, 210 and 212 of FIG. 7, and the plate 115 is removed from the beam in the other measurements. In the PSI measurements of steps 208, 210, 212, the portion of measuring light reflected from mirror 85 and contributing to the generated interference pattern traverses the optical element 101 and experiences a dispersion generated by the substrate material of the optical element 101. Such dispersion may reduce the modulation or contrast of the generated interference pattern. Therefore, a corresponding compensating plate 115 made from the same material as the optical element and having a substantially same thickness is disposed in beam 21a of the optical delay apparatus to induce a corresponding dispersion in the other beam of measuring light reflected from reference surface 71 and also contributing to the interference pattern.

The optical delay apparatus 5a further comprises an interference filter 117 which may be disposed in beam 7a during movements of retro-reflector 29a to scan the detected intensity I in view of locating a condition Δz=0. During the PSI measurements illustrated above, the interference filter 117 is removed from beam 7a as illustrated in solid lines of FIG. 6. When the filter 117 is disposed in the beam 7a as indicated in broken lines in FIG. 6, the interference filter will increase the coherence of the measuring light traversing the filter. This will result in that the oscillations shown in FIG. 5 have a significantly broader envelope such that the detection of the condition Δz=0 is facilitated due to a higher possible speed of the movement of the retro-reflector during the scan of intensities.

Figure 8:
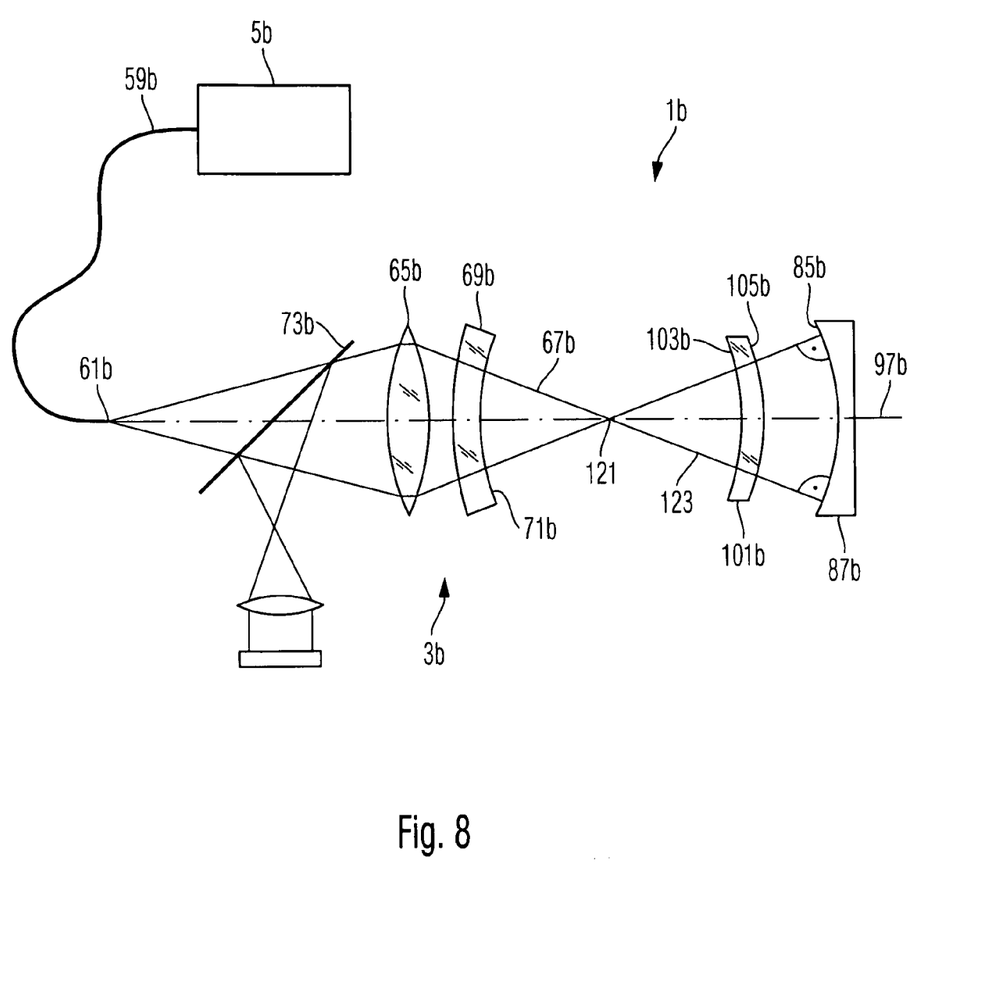
FIG. 8 is a schematic illustration of an interferometer system according to a further embodiment of the invention.

FIG. 8 illustrates a further embodiment of an interferometer system for measuring an optical element 101b which has a concave front surface 103b and a convex back surface 105b. Both surfaces 103b and 105b are substantially spherical surfaces having substantially coinciding centers of curvature. Such type of optical element is also known in the art as meniscus lens.

The interferometer system 1b comprises an optical delay apparatus 5b as illustrated above supplying measuring light through an optical fiber 59b to a Fizeau interferometer having an interferometer optics comprising two lenses 65b and 69b generating a beam 67b of measuring light such that the beam 67b is a converging beam having substantially spherical wavefronts. Beam 67b is focused on a location 121 on an optical axis 97b and forms a diverging beam 123 having spherical wavefronts downstream of focus or crossover 121. A mirror 87b has a substantially spherical reference surface 85b disposed on the optical axis 97b such that a center of curvature of the reference surface 85b coincides with the crossover 121.

The interferometer optics 65b, 69b has a reference surface 71b formed on one surface of lens 69b facing towards crossover 121. Reference surface 71b is a spherical surface having a center of curvature coinciding with crossover 121. A cavity is formed between reference surface 71b and reference surface 85b.

The optical element 101b to be tested according to the method illustrated with reference to FIG. 7 above is positioned in the cavity formed between reference surfaces 71b and 85b in steps 204 to 212 such that the centers of curvature of surfaces 103b and 105b substantially coincide with the crossover 121.

A thickness of meniscus lens 101b, deviations of surfaces 103b and 105b from their perfectly spherical shape, a refractive index of a material of the meniscus lens 101b and deviations thereof across its surface may be determined by performing the above illustrated measurements and calculations.

According to another exemplary aspect, there is provided a method of manufacturing an optical element having opposite first and second surfaces using an interferometer system. The interferometer system comprises: an optical delay apparatus including at least one beam splitter and at least one reflector for providing first and second optical paths having first and second optical path lengths, respectively, for a beam of light traversing the optical delay apparatus, wherein a distance between the at least one beam splitter and the at least one reflector is adjustable to adjust an optical path length difference between the first and second optical path lengths; an interferometer apparatus including an interferometer optics, a first reference surface, and a second reference surface disposed at a distance from the first reference surface to form a cavity there between; a light source for generating light of a coherence length; and a position sensitive detector including a light detecting surface. The light source, the optical delay apparatus, the interferometer apparatus and the detector can be arranged such that measuring light generated by the light source may traverse the optical delay apparatus and the interferometer apparatus to be incident on the detector, such that at least a portion of the first reference surface is imaged onto at least a portion of the light detecting surface of the detector with measuring light reflected from the first reference surface, such that at least a portion of the second reference surface is imaged onto the portion of the light detecting surface of the detector with measuring light reflected from the second reference surface. The method comprises: disposing the optical element within the cavity such that the first surface of the optical element is oriented towards the first reference surface and the second surface of the optical element is oriented towards the second reference surface, such that at least portions of the first and second surfaces of the optical element are each imaged onto the portion of the light detecting surface of the detector with measuring light, and adjusting the optical path length difference of the optical delay apparatus to be substantially equal to an optical path difference between the second surface of the optical element and the second reference surface, and detecting at least one second interference pattern generated by measuring light reflected from the second surface of the optical element which is superimposed on the portion of the light detecting surface of the detector with measuring light reflected from the second reference surface; not disposing the optical element within the cavity; and adjusting the optical path length difference of the optical delay apparatus to be substantially equal to an optical path difference between the first reference surface and the second reference surface, and detecting, while the optical element is not disposed in the cavity, at least one third interference pattern generated by measuring light reflected from the first reference surface which is superimposed on the portion of the light detecting surface of the detector with measuring light reflected from the second reference surface; and processing the second surface of the optical element based on the at least one second and the at least one third interference pattern.

In this regard, a surface height of the second surface of the optical element can be determined substantially according to the following formula:

$$l_3 = -\frac{1}{2}OPD_3 + l_4 + const$$

wherein
$l_3$ represents the surface height of the first surface of the optical element;
$OPD_3$ represents an optical path difference determined from the second interference pattern;
$OPD_{4a}$ represents an optical path difference determined from the third interference pattern;
$l_4$ represents a surface height of the first surface of the second reference surface; and
const represents a constant.

In another exemplary aspect, there is provided a method of manufacturing an optical element having opposite first and second surfaces using an interferometer system. The interferometer system comprises: an optical delay apparatus including at least one beam splitter and at least one reflector for providing first and second optical paths having first and second optical path lengths, respectively, for a beam of light traversing the optical delay apparatus, wherein a distance between the at least one beam splitter and the at least one reflector is adjustable to adjust an optical path length difference between the first and second optical path lengths; an interferometer apparatus including an interferometer optics, a first reference surface, and a second reference surface disposed at a distance from the first reference surface to form a cavity there between; a light source for generating light of a coherence length; and a position sensitive detector including a light detecting surface. The light source, the optical delay apparatus, the interferometer apparatus and the detector can be arranged such that measuring light generated by the light source may traverse the optical delay apparatus and the interferometer apparatus to be incident on the detector, such that at least a portion of the first reference surface is imaged onto at least a portion of the light detecting surface of the detector with measuring light reflected from the first reference surface, such that at least a portion of the second reference surface is imaged onto the portion of the light detecting surface of the detector with measuring light reflected from the second reference surface. The method comprises: disposing the optical element within the cavity such that the first surface of the optical element is oriented towards the first reference surface and the second surface of the optical element is oriented towards the second reference surface, such that at least portions of the first and second surfaces of the optical element are each imaged onto the portion of the light detecting surface of the detector with measuring light, and adjusting the optical path length difference of the optical delay apparatus to be substantially equal to an optical path difference between the first reference surface and the second reference surface while the optical element is disposed in the cavity, and detecting, while the optical element is disposed in the cavity, at least one fourth interference pattern generated by measuring light reflected from the first reference surface which is superimposed on the portion of the light detecting surface of the detector with measuring light reflected from the second reference surface; not disposing the optical element within the cavity; and adjusting the optical path length difference of the optical delay apparatus to be substantially equal to an optical path difference between the first reference surface and the second reference surface, and detecting, while the optical element is not disposed in the cavity, at least one third interference pattern generated by measuring light reflected from the first reference surface which is superimposed on the portion of the light detecting surface of the detector with measuring light reflected from the second reference surface; processing at least one of the first and second surfaces of the optical element based on the at least one fourth and the at least one third interference pattern.

In this regards, a refractive index of a material of the optical element can be determined substantially according to the following formula:

$$n = 1 + \frac{1}{2d}(OPD_{4b} - OPD_{4a})$$

wherein n represents the refractive index of the material of the optical element;

d represents a thickness of the optical element;

$OPD_{4b}$ represents an optical path difference determined from the fourth interference pattern; and $OPD_{4a}$ represents an optical path difference determined from the third interference pattern.

The method can further comprise: adjusting the optical path length difference of the optical delay apparatus to be substantially equal to an optical path difference between the first and second surface of the optical element, and detecting, while the optical element is disposed in the cavity, at least one fifth interference pattern generated by measuring light reflected from the first surface of the optical element which is superimposed on the portion of the light detecting surface of the detector with measuring light reflected from the second surface of the optical element; wherein the processing of the optical element is further performed based on the at least one fifth interference pattern.

Also, a variation of a refractive index of a material of the optical element can be determined substantially according to the following formula:

$$\Delta n = n - \bar{n} = \frac{1}{2d}\bar{n}(OPD_{4b} - OPD_{4a}) - (\bar{n} - 1)OPD_{HV}$$

wherein $\Delta n$ represents the variation of the refractive index of the material of the optical element;

d represents a thickness of the optical element;

$\bar{n}$ represents the refractive index of the material of the optical element averaged over a cross section thereof;

$OPD_{4b}$ represents an optical path difference determined from the fourth interference pattern; and $OPD_{4a}$ represents an optical path difference determined from the third interference pattern.

In the above illustrated embodiments, an optical fiber is used to supply the light from the optical delay apparatus to the Fizeau interferometer. It is, however, also possible to directly supply the light from the optical delay apparatus to the Fizeau interferometer using a light beam traveling in free space.

To summarize, embodiments of the present invention relate to a method of manufacturing an optical element comprising an interferometric test of the optical element using an interferometer system of a Fizeau type combined with principles of white-light interferometry. The optical element is disposed in a cavity between a Fizeau surface and a mirror, and an optical path difference between a back surface of the optical element and the mirror is determined for determining parameters of the optical element, such as a thickness thereof. Measuring light from an optical delay apparatus is supplied to the Fizeau interferometer through an optical fiber.

The present invention has been described by way of exemplary embodiments to which it is not limited. Variations and modifications will occur to those skilled in the art without departing from the scope of the present invention as recited in the appended claims and equivalents thereof.

What is claimed is:

1. An interferometer system comprising:

an optical delay apparatus including at least one beam splitter and at least one reflector for providing first and second optical paths having first and second optical path lengths, respectively, for a beam of light traversing the optical delay apparatus, wherein a distance between the at least one beam splitter and the at least one reflector is adjustable to adjust an optical path length difference between the first and second optical path lengths;

a light source for generating light of a coherence length; and a Fizeau interferometer including an interferometer optics and a first Fizeau reference surface for directing measuring light towards an optical surface to be tested and disposed at a distance greater than half of the coherence length from the first Fizeau reference surface;

a position sensitive detector including a light detecting surface;

wherein the light source, the optical delay apparatus, the Fizeau interferometer and the detector are arranged such that measuring light generated by the light source may traverse the optical delay apparatus and the Fizeau interferometer to be incident on the detector, such that a portion of the measuring light traversing the Fizeau interferometer is reflected from the first Fizeau reference surface, such that a portion of the measuring light traversing the Fizeau interferometer is reflected from the optical surface to be tested, and such that at least portions of the Fizeau surface and of the optical surface to be tested are imaged through the interferometer optics onto at least a portion of the light detecting surface of the detector;

wherein the interferometer system further comprises an aberration reducing transfer optics to supply the measuring light having traversed the optical delay apparatus to the Fizeau interferometer, wherein the aberration reducing transfer optics comprises an optical fiber.

2. The interferometer system according to claim 1, wherein the optical fiber is a mono mode fiber.

3. The interferometer system according to claim 1, wherein the optical delay apparatus comprises an adjustable light attenuator disposed in at least one of the first and second beam paths.

4. A method of manufacturing an optical element having opposite first and second surfaces using an interferometer system, the interferometer system comprising:

an optical delay apparatus including at least one beam splitter and at least one reflector for providing first and second optical paths having first and second optical path lengths, respectively, for a beam of light traversing the optical delay apparatus, wherein a distance between the at least one beam splitter and the at least one reflector is adjustable to adjust an optical path length difference between the first and second optical path lengths;

an interferometer apparatus including an interferometer optics, a first reference surface, and a second reference surface disposed at a distance from the first reference surface to form a cavity there between;

a light source for generating light of a coherence length; and a position sensitive detector including a light detecting surface;

wherein the light source, the optical delay apparatus, the interferometer apparatus and the detector are arranged such that measuring light generated by the light source may traverse the optical delay apparatus and the interferometer apparatus to be incident on the detector, such that at least a portion of the first reference surface is imaged onto at least a portion of the light detecting surface of the detector with measuring light reflected from the first reference surface, such that at least a portion of the second reference surface is imaged onto the portion of the light detecting surface of the detector with measuring light reflected from the second reference surface, wherein the method comprises:

disposing the optical element within the cavity such that the first surface of the optical element is oriented towards the first reference surface and the second surface of the optical element is oriented towards the second reference surface, such that at least portions of the first and second surfaces of the optical element are each imaged onto the portion of the light detecting surface of the detector with measuring light, and adjusting the optical path length difference of the optical delay apparatus to be substantially equal to an optical path difference between the first reference surface and the first surface of the optical element, and detecting at least one first interference pattern generated by measuring light reflected from the first reference surface which is superimposed on the portion of the light detecting surface of the detector with measuring light reflected from the first surface of the optical element;

adjusting the optical path length difference of the optical delay apparatus to be substantially equal to an optical path difference between the second surface of the optical element and the second reference surface, and detecting at least one second interference pattern generated by measuring light reflected from the second surface of the optical element which is superimposed on the portion of the light detecting surface of the detector with measuring light reflected from the second reference surface;

processing at least one of the first and second surfaces of the optical element based on the at least one first and the at least one second interference pattern.

5. The method according to claim 4, further comprising:

not disposing the optical element within the cavity; and adjusting the optical path length difference of the optical delay apparatus to be substantially equal to an optical path difference between the first reference surface and the second reference surface, and detecting, while the optical element is not disposed in the cavity, at least one third interference pattern generated by measuring light reflected from the first reference surface which is superimposed on the portion of the light detecting surface of the detector with measuring light reflected from the second reference surface;

wherein the processing of the optical element is further performed based on the at least one third interference pattern.

6. The method according to claim 5, further comprising determining a distance between the first and second surfaces of the optical element substantially according to the following formula:

$$d = \frac{1}{2}(OPD_{4a} - OPD_1 - OPD_3)$$

wherein d represents the distance between the first and second surfaces of the optical element, $OPD_{4a}$ represents an optical path difference determined from the third interference pattern;

$OPD_1$ represents an optical path difference determined from the first interference pattern;

$OPD_3$ represents an optical path difference determined from the second interference pattern.

7. The method according to claim 4, wherein the processing of the optical surface of the optical element comprises at least one of milling, grinding, loose abrasive grinding, polishing, ion beam figuring, magneto-rheological figuring, and finishing the optical surface of the optical element.

8. The method according to claim 7, wherein the finishing comprises applying a coating to the optical surface.

9. The method according to claim 8, wherein the coating comprises at least one of a reflective coating, an anti-reflective coating and a protective coating.

10. The method according to claim 4, wherein the first and second surfaces of optical element are substantially flat surfaces oriented parallel to each other.

11. The method according to claim 4, wherein the first and second surfaces of optical element are substantially spherical surfaces having substantially coinciding centers of curvature.

12. A method of manufacturing an optical element having opposite first and second surfaces using an interferometer system, the interferometer system comprising:

an optical delay apparatus including at least one beam splitter and at least one reflector for providing first and second optical paths having first and second optical path lengths, respectively, for a beam of light traversing the optical delay apparatus, wherein a distance between the at least one beam splitter and the at least one reflector is adjustable to adjust an optical path length difference between the first and second optical path lengths;

an interferometer apparatus including an interferometer optics, a first reference surface, and a second reference surface disposed at a distance from the first reference surface to form a cavity there between;

a light source for generating light of a coherence length; and a position sensitive detector including a light detecting surface;

wherein the light source, the optical delay apparatus, the interferometer apparatus and the detector are arranged such that measuring light generated by the light source may traverse the optical delay apparatus and the interferometer apparatus to be incident on the detector, such that at least a portion of the first reference surface is imaged onto at least a portion of the light detecting surface of the detector with measuring light reflected from the first reference surface, such that at least a portion of the second reference surface is imaged onto the portion of the light detecting surface of the detector with measuring light reflected from the second reference surface, wherein the method comprises:

disposing the optical element within the cavity such that the first surface of the optical element is oriented towards the first reference surface and the second surface of the optical element is oriented towards the second reference surface, such that at least portions of the first and second surfaces of the optical element are each imaged onto the portion of the light detecting surface of the detector with measuring light, and adjusting the optical path length difference of the optical delay apparatus to be substantially equal to an optical path difference between the first reference surface and the second reference surface while the optical element is disposed in the cavity, and detecting, while the optical element is disposed in the cavity, at least one fourth interference pattern generated by measuring light reflected from the first reference surface which is superimposed on the portion of the light detecting surface of the detector with measuring light reflected from the second reference surface;

adjusting the optical path length difference of the optical delay apparatus to be substantially equal to an optical path difference between the first and second surface of the optical element, and detecting, while the optical element is disposed in the cavity, at least one fifth interference pattern generated by measuring light reflected from the first surface of the optical element which is superimposed on the portion of the light detecting surface of the detector with measuring light reflected from the second surface of the optical element;

not disposing the optical element within the cavity; and adjusting the optical path length difference of the optical delay apparatus to be substantially equal to an optical path difference between the first reference surface and the second reference surface, and detecting, while the optical element is not disposed in the cavity, at least one third interference pattern generated by measuring light reflected from the first reference surface which is superimposed on the portion of the light detecting surface of the detector with measuring light reflected from the second reference surface;

processing at least one of the first and second surfaces of the optical element based on the at least one third, the at least one fourth and the at least one fifth interference pattern.

13. The method according to claim 12, wherein a distance between the first and second surfaces of the optical element is determined substantially according to the following formula:

$$d = -\frac{1}{2}(OPD_{4b} - OPD_{4a} - OPD_{HV})$$

wherein d represents the distance between the first and second surfaces of the optical element, $OPD_{4b}$ represents an optical path difference determined from the fourth interference pattern;

$OPD_{4a}$ represents an optical path difference determined from the third interference pattern;

$OPD_{HV}$ represents an optical path difference determined from the fifth interference pattern.

14. A method of manufacturing an optical element having opposite first and second surfaces using an interferometer system, the interferometer system comprising:

an optical delay apparatus including at least one beam splitter and at least one reflector for providing first and second optical paths having first and second optical path lengths, respectively, for a beam of light traversing the optical delay apparatus, wherein a distance between the at least one beam splitter and the at least one reflector is adjustable to adjust an optical path length difference between the first and second optical path lengths;

an interferometer apparatus including an interferometer optics, a first reference surface, and a second reference surface disposed at a distance from the first reference surface to form a cavity there between;

a light source for generating light of a coherence length; and a position sensitive detector including a light detecting surface;

wherein the light source, the optical delay apparatus, the interferometer apparatus and the detector are arranged such that measuring light generated by the light source may traverse the optical delay apparatus and the interferometer apparatus to be incident on the detector, such that at least a portion of the first reference surface is imaged onto at least a portion of the light detecting surface of the detector with measuring light reflected from the first reference surface, such that at least a portion of the second reference surface is imaged onto the portion of the light detecting surface of the detector with measuring light reflected from the second reference surface, wherein the method comprises:

disposing the optical element within the cavity such that the first surface of the optical element is oriented towards the first reference surface and the second surface of the optical element is oriented towards the second reference surface, such that at least portions of the first and second surfaces of the optical element are each imaged onto the portion of the light detecting surface of the detector with measuring light, and adjusting the optical path length difference of the optical delay apparatus to be substantially equal to an optical path difference between the first reference surface and the second reference surface while the optical element is disposed in the cavity, and detecting, while the optical element is disposed in the cavity, at least one fourth interference pattern generated by measuring light reflected from the first reference surface which is superimposed on the portion of the light detecting surface of the detector with measuring light reflected from the second reference surface;

adjusting the optical path length difference of the optical delay apparatus to be substantially equal to an optical path difference between the first reference surface and the second surface of the optical element, and detecting, while the optical element is disposed in the cavity, at least one sixth interference pattern generated by measuring light reflected from the first reference surface which is superimposed on the portion of the light detecting surface of the detector with measuring light reflected from the second surface of the optical element;

adjusting the optical path length difference of the optical delay apparatus to be substantially equal to an optical path difference between the first surface of the optical element and the second reference surface, and detecting, while the optical element is disposed in the cavity, at least one seventh interference pattern generated by measuring light reflected from the first surface of the optical element which is superimposed on the portion of the light detecting surface of the detector with measuring light reflected from the second reference surface;

not disposing the optical element within the cavity; and adjusting the optical path length difference of the optical delay apparatus to be substantially equal to an optical path difference between the first-reference surface and the second reference surface, and detecting, while the optical element is not disposed in the cavity, at least one third interference pattern generated by measuring light reflected from the first reference surface which is superimposed on the portion of the light detecting surface of the detector with measuring light reflected from the second reference surface;

processing at least one of the first and second surfaces of the optical element based on the at least one third, the at least one fourth, the at least one sixth, and the at least one seventh interference pattern.

15. The method according to claim 14, wherein a distance between the first and second surfaces of the optical element is determined substantially according to the following formula:

$$d = -\frac{1}{2}(2OPD_{4b} - OPD_{4a} - OPD_2 - OPD_5)$$

wherein d represents the distance between the first and second surfaces of the optical element, $OPD_{4b}$ represents an optical path difference determined from the fourth interference pattern;

$OPD_{4a}$ represents an optical path difference determined from the third interference pattern;

$OPD_2$ represents an optical path difference determined from the sixth interference pattern; and $OPD_5$ represents an optical path difference determined from the seventh interference pattern.

16. A method of manufacturing an optical element having opposite first and second surfaces using an interferometer system, the interferometer system comprising:

an optical delay apparatus including at least one beam splitter and at least one reflector for providing first and second optical paths having first and second optical path lengths, respectively, for a beam of light traversing the optical delay apparatus, wherein a distance between the at least one beam splitter and the at least one reflector is adjustable to adjust an optical path length difference between the first and second optical path lengths;

an interferometer apparatus including an interferometer optics, a first reference surface, and a second reference surface disposed at a distance from the first reference surface to form a cavity there between;

a light source for generating light of a coherence length; and a position sensitive detector including a light detecting surface;

wherein the light source, the optical delay apparatus, the interferometer apparatus and the detector are arranged such that measuring light generated by the light source may traverse the optical delay apparatus and the interferometer apparatus to be incident on the detector, such that at least a portion of the first reference surface is imaged onto at least a portion of the light detecting surface of the detector with measuring light reflected from the first reference surface, such that at least a portion of the second reference surface is imaged onto the portion of the light detecting surface of the detector with measuring light reflected from the second reference surface, wherein the method comprises:

disposing the optical element within the cavity such that the first surface of the optical element is oriented towards the first reference surface and the second surface of the optical element is oriented towards the second reference surface, such that at least portions of the first and second surfaces of the optical element are each imaged onto the portion of the light detecting surface of the detector with measuring light, and adjusting the optical path length difference of the optical delay apparatus to be substantially equal to an optical path difference between the first reference surface and the first surface of the optical element, and detecting at least one first interference pattern generated by measuring light reflected from the first reference surface which is superimposed on the portion of the light detecting surface of the detector with measuring light reflected from the first surface of the optical element;

not disposing the optical element within the cavity; and adjusting the optical path length difference of the optical delay apparatus to be substantially equal to an optical path difference between the first reference surface and the second reference surface, and detecting, while the optical element is not disposed in the cavity, at least one third interference pattern generated by measuring light reflected from the first reference surface which is superimposed on the portion of the light detecting surface of the detector with measuring light reflected from the second reference surface;

processing the first surface of the optical element based on the at least one first and the at least one third interference pattern.

17. The method according to claim 16, wherein a surface height of the first surface of the optical element is determined substantially according to the following formula:

$$l_2 = \frac{1}{2}(OPD_1 - OPD_{4a}) - l_4 + const$$

wherein $l_1$ represents the surface height of the first surface of the optical element;

$OPD_1$ represents an optical path difference determined from the first interference pattern;

$OPD_{4a}$ represents an optical path difference determined from the third interference pattern;

$l_4$ represents a surface height of the first surface of the second reference surface; and const represents a constant.

* * * * *